United States Patent [19]

Nicholson

[11] 4,258,745
[45] Mar. 31, 1981

[54] CONTROL DEVICE FOR A LIQUID LEVEL MAINTAINING SYSTEM OR THE LIKE

[76] Inventor: Dean Nicholson, 1691 Reed St., Apt. #1, Lakewood, Colo. 80215

[21] Appl. No.: 19,659

[22] Filed: Mar. 12, 1979

[51] Int. Cl.³ ............... F16K 31/126; G01F 23/20; G05D 9/02
[52] U.S. Cl. ............................ 137/403; 73/302
[58] Field of Search ............ 73/302; 137/386, 403, 137/426, 446, 447, 406

[56] References Cited

U.S. PATENT DOCUMENTS

| 582,911 | 5/1897 | Frederick | 137/446 |
|---|---|---|---|
| 786,638 | 4/1905 | Flinn | 417/38 |
| 1,602,820 | 10/1926 | Jones et al. | 137/403 |
| 1,602,821 | 10/1926 | Jones et al. | 137/403 |
| 1,603,162 | 10/1926 | Star | 73/302 |
| 2,514,632 | 7/1950 | Flubacker | 417/38 |
| 2,614,424 | 10/1952 | Thoresen | 73/213 |
| 2,649,714 | 8/1953 | Griffith, Jr. | 73/299 |
| 3,130,155 | 4/1964 | Heskett | 137/403 |
| 3,181,556 | 5/1965 | Baker | 73/302 |
| 3,200,971 | 8/1965 | Trethewey | 137/403 |
| 3,314,445 | 4/1967 | Brodt | 137/396 |
| 3,411,529 | 11/1968 | Bassett | 137/403 |
| 3,586,017 | 6/1971 | Walters | 137/403 |
| 3,895,645 | 7/1975 | Johnson | 137/403 |
| 4,094,327 | 6/1978 | Brandelli | 137/403 |
| 4,180,096 | 12/1979 | Johnson | 137/403 |

Primary Examiner—Martin P. Schwadron
Assistant Examiner—G. L. Walton
Attorney, Agent, or Firm—Wm. Griffith Edwards

[57] ABSTRACT

A control for a liquid level regulating system including a casing which is immersed in the liquid to a depth at which control is to be effected, a loose flexible diaphragm closes the casing at the bottom and is moved in accordance with the liquid head. A plunger mounted in the casing for free vertical movement within a selected range has a disc-like foot positioned for free engagement by the diaphragm. An adjustable spring and stops are provided for setting the range of movement. Vertical movement of the plunger actuates a cam or screw to vary the setting of the control element of the level control system. This element may be the discharge outlet control. The control provides quick response and actuates the level control to effect accurate maintenance of the required liquid level in an air pressure control system or, for example, a variable resistance control in an electrical control system.

19 Claims, 7 Drawing Figures

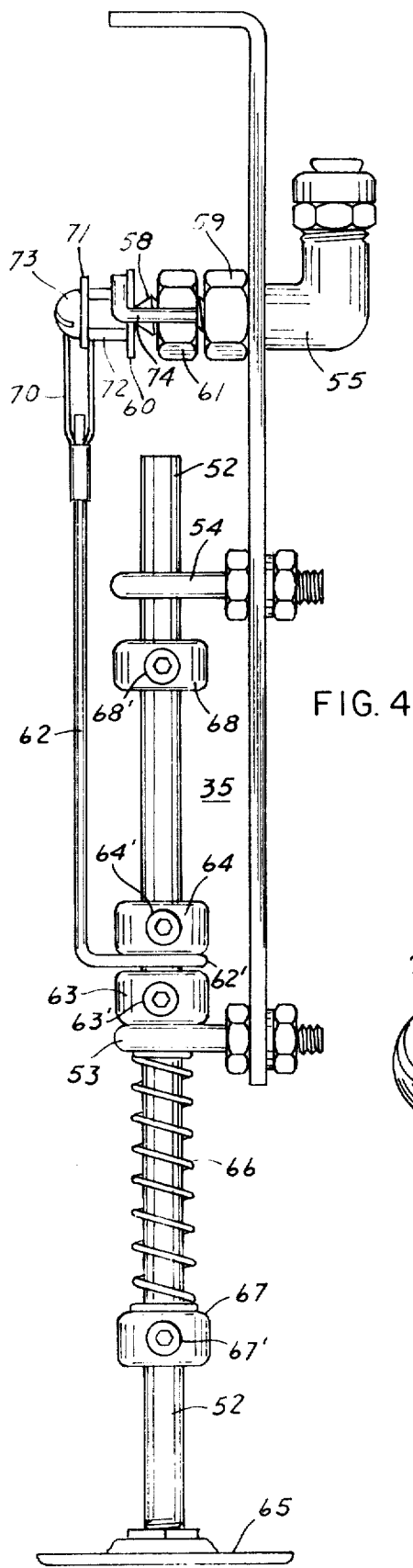
FIG. 4
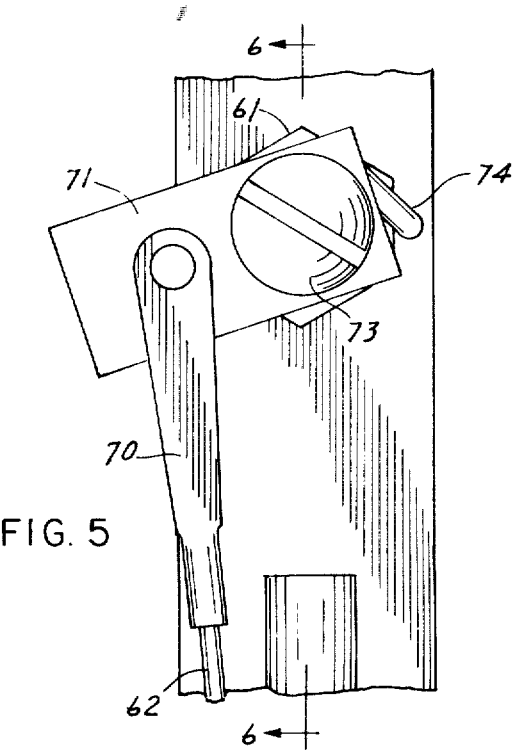
FIG. 5
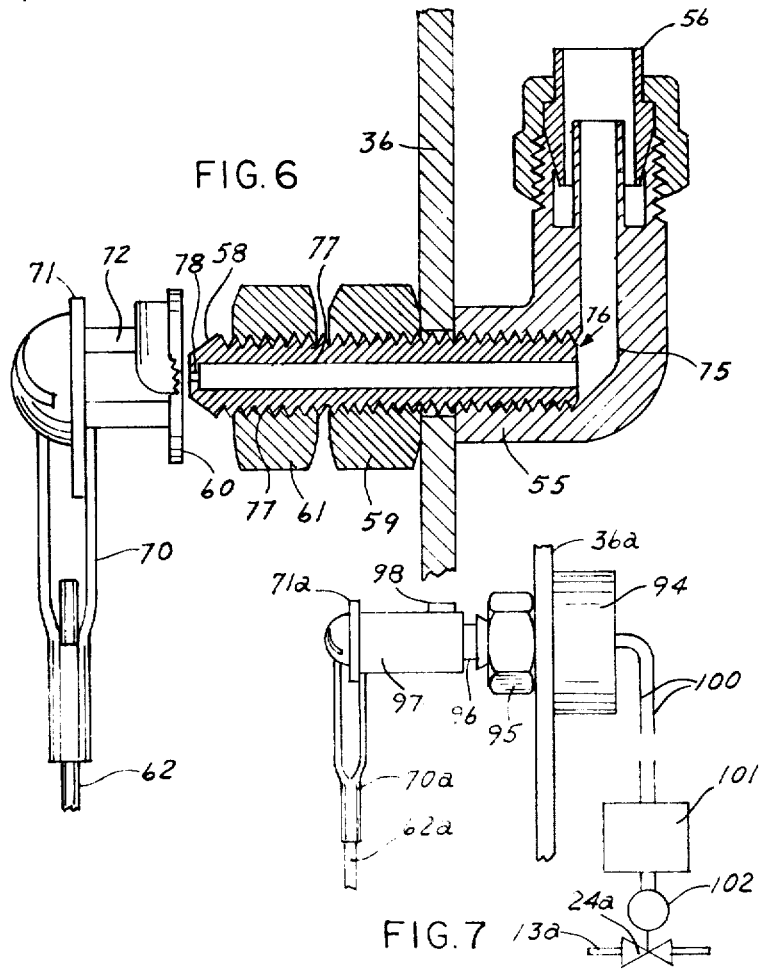
FIG. 6
FIG. 7

CONTROL DEVICE FOR A LIQUID LEVEL MAINTAINING SYSTEM OR THE LIKE

This invention relates to a control device for liquid level control systems and particularly to an improved device for converting variations of liquid head to analogue values of the medium for actuating the control element of a liquid level system.

BACKGROUND OF THE INVENTION

Various devices have been employed for maintaining predetermined levels of liquids, slurries and the like in tanks and other containing vessels. Float mechanisms and pressure responsive devices have been used for this purpose; these devices include electrical resistance controlled systems, air pressure controlled systems and devices such as the so called "bubbler" controls, which involve the release of gas into the liquid or slurry at selected distances below the surface. While these devices have been satisfactory for a wide range of applications, they involve problems in many applications in which contamination of the liquid or slurry must be avoided. Accordingly, it is an object of this invention to provide an improved device for controlling the level of liquids, slurries and the like.

It is another object of this invention to provide a liquid level control system including a level responsive device having an improved arrangement for preventing contamination of the liquid by the operation of the device.

It is another object of this invention to provide an improved liquid level sensing device for activation of air pressure actuated level control systems.

It is a further object of this invention to provide an improved, reliable and highly sensitive liquid level probe or sensing device for a system for controlling the level of a liquid, or a slurry or the like.

SUMMARY OF THE INVENTION

Briefly, in carrying out the objects of this invention in one embodiment thereof, a liquid level control system is provided which includes an air pressure control actuated to maintain a predetermined level of liquid by a liquid level sensing control embodying the invention. The control includes a closed casing mounted on the edge of the tank containing the liquid and extending to a selected distance below the level to be maintained. The bottom of the casing is provided with a loose diaphragm and an actuating member for the control is positioned adjacent the bottom where it will be engaged by the diaphragm under the influence of the liquid head at the level selected. The control includes a linkage and a cam mechanism actuated by movement of the sensing head, the cam changing the position of a plate opposite an air dischare orifice of the air control system. Movement of the plate toward and away from the orifice determines the signal pressure which will be maintained in the air pressure control system. The system is arranged to control the discharge from the tank so that regardless of the input of liquid to the tank the level will be maintained as determined by the operation of the sensing control.

The features of novelty which characterize this invention are pointed out with particularity in the claims annexed to and forming apart of this specification. The invention itself, however, both as to its organization and its manner of operation, together with further objects and advantages thereof, will best be understood upon reference to the following description in connection with the accompanying drawings.

BRIEF DESCRIPTION OF THE DRAWINGS

FIG. 4 is an enlarged rear elevation view of a portion of the device of FIG. 2;

FIG. 5 is an enlarged left-hand side view of a portion of the device as shown in FIG. 4;

FIG. 6 is an enlarged sectional view of the device taken along the line 6–6 of FIG. 5; and FIG. 7 is a somewhat diagrammatic view illustrating another embodiment of the invention.

DESCRIPTION OF THE PREFERRED EMBODIMENTS

Figure 1:
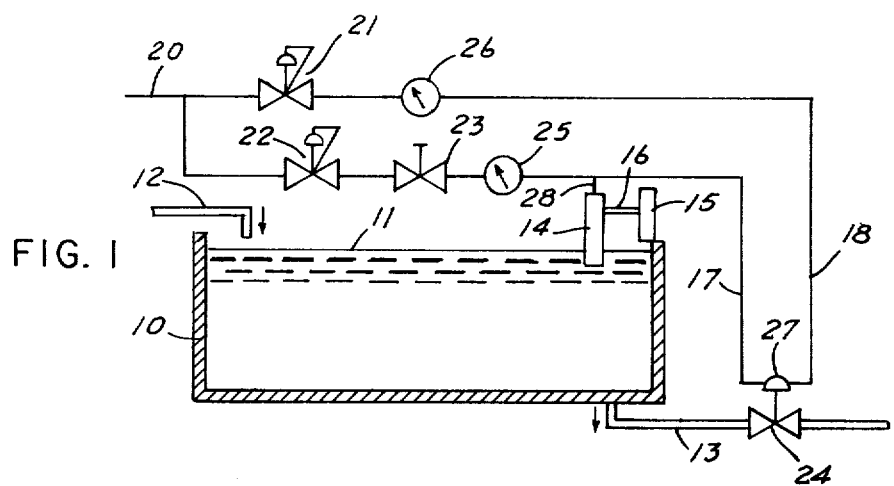
FIG. 1 is a diagrammatic representation of an air pressure actuated level control system embodying the invention.

Referring now to the drawings, FIG. 1 illustrates diagrammatically a tank or container 10 which is filled with a liquid or slurry to a level 11 and is provided with an input or supply pipe 12 and a discharge pipe 13 connected to receive fluid material from the bottom of the tank. The inlet conduit 12 may supply fluid to the tank 10 at a substantially constant rate or at widely varying rates and the level of the fluid in the tank is maintained at the level 11 by operation of a control device 14 which embodies the present invention. The device 14 is mounted on the top wall of the tank 10 on a support 15 which is provided with an adjustable arm 16 to which the device 14 is attached. The arm 16 may be adjusted to change the depth at which the bottom of the device 14 is set in the liquid within the tank 10. By way of example, the device 14 has been illustrated as controlling the signal pressure in a signal air supply pipe 17. Air is supplied from a filtered air source connected to the intake of the air control system indicated at 20 and the pressure in an operation air supply pipe 18 is controlled by a regulator 21 to maintain a predetermined constant value of the air pressure therein. The air supplied to the pipe 17 is maintained at a selected value by a regulator 22 which delivers the air at a predetermined pressure through a manual control valve 23 to pipe 17. The valve 23 is set to restrict the flow of control air to a selected maximum. A valve 24 in the line 13 controls the discharge of liquid from the tank 10 and is controlled to maintain the level in the tank by operation of the device 14. Pressure gauges are provided in the lines 17 and 18 as indicated at 25 and 26, respectively. The operation of the device 14 is such that upon an increase in the height of the level 11 the value 24 will be opened to a wider position and thereby reduce the level to the desired predetermined value. The operation of valve 24 is controlled by a signal pressure responsive control device 27, the operation of the device is effected by the signal pressure supplied to the line 17. The valve 24 is actuated by the operating air pressure supplied through the line 18. The device 14 recieves air through a connection 28 and discharges from the line 17 air in excess of that required for generation of the signal. An air vent 29 is provided from the casing to the atmosphere near the top of the casing.

Figure 2:
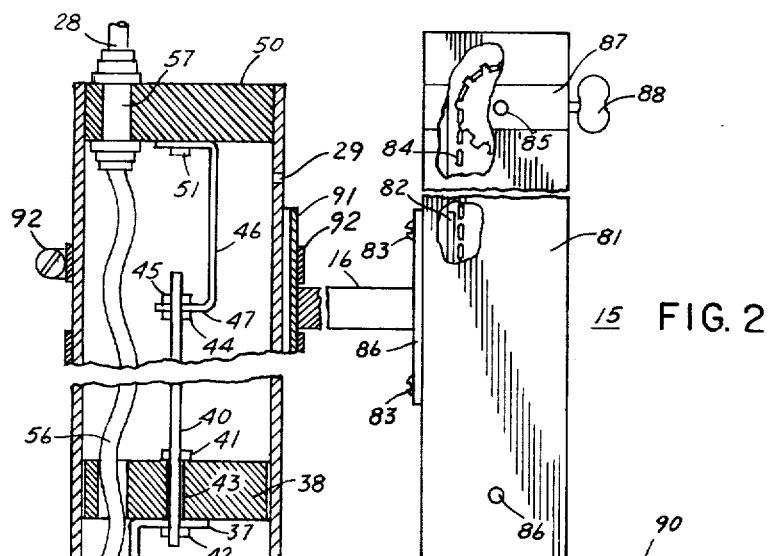
FIG. 2 is an enlarged sectional elevation view of the sensing device of FIG. 1.

The device 14 as illustrated in FIG. 2 comprises a cylindrical casing 30 closed at its bottom by a loose diaphragm 31 of thin rubber or a freely flexible plastic material. The diaphragm is secured to the bottom of the cylinder 30 by a ring or washer 32 which is secured to a ring 33 cemented or otherwise bonded to the bottom of the cylinder 30. The diaphragm 31 is placed with its outer annular portion between the rings 32 and 33 and clamped therebetween by screws or bolts 34. The cylinder 30 and the rings 32 and 33 are made of a suitable plastic material such as polyvinyl chloride. A sensing mechansim 35 is mounted within the lower portion of the casing 30 on a rigid vertical support 36 which has an angle portion 37 secured against a plastic partition member 38 which is freely slidable within the casing. The member 37 is secured to the partition 38 by a long threaded rod 40 and the top and bottom nuts 41 and 42 which are tightened to hold the rod against the partition 38, the rod passing through a hole or bore 43 in the partition. The upper end of the threaded rod 40 is secured by nuts 44 and 45 to a bracket member 46 having an angle portion 47 in which the rod 44 is secured and a top angle member 48 which is secured to a plastic closure disc 50 fitted within the top of the cylinder 30. Bracket 46 is secured to the closure 50 by a suitable bolt or screw 51. The sensing mechanism 35 includes an elongated member or rod 52 which passes through space eyebolts 53 and 54 which are secured to the support member 36. Support member 36 also carries an elbow member 55 which is a tube and is connected to a flexible tube or hose 56 which passes through a bulkhead union 57 in the member 50 and is connected to the air supply pipe 28 and hence with the air conduit 17. The air at a pressure as determined by the regulator 22 is thus supplied to the connection 55; this connection is provided with a nozzle 58 having an orifice the degree of opening of which is controlled by a plate 60 which is connected directly to a nut 61 threaded on the body of the nozzle 58. The elbow 55 is secured to the bracket 36 by a nut 59 threaded on the nozzle and tightened against the bracket. An actuating link 62 is connected with the rod 52 between adjusting nuts 63 and 64, the link 62 having a loop 62' extending about the rod and held loosely between the nuts 63 and 64 to permit free rotary movement with respect to the rod 52. When the nut 61 is turned it moves on the threads toward or away from the nut 59. The rod 52 has as its bottom end a disc or foot 65 which is positioned to lie in the path of the diapragm 31 when the diaphragm is pressed upwardly by the head pressure of the liquid in the tank 10. The rod 52 is biased downwardly by a spring 66 which is compressed between the eyebolt 53 and an adjustable collar 67 on the rod 52.

In FIG. 2 the disc or foot 65 is shown in its bottom position, the adjusting collar 63 resting against the top of the eyebolt 53. The range of movement of the rod 52 is determined by the setting of a collar 68 toward the upper end of the rod and below the eyeblot 54. The range of movement thus being represented by the spacing between the top of the collar 68 and the bottom of the eyebolt 54. The upper end of the link 62 is provided with a yoke 70 which is pivotally connected to an arm 71 which is secured to the rotatable member 60. The connections of the link 62 at both ends are sufficiently free that rotation and jamming of the link does not occur. At the same time, there is essentially no lost motion during the vertical movement of the link which drives the arm 71 posititvely in accordance with movement of the rod 52.

Figure 3:
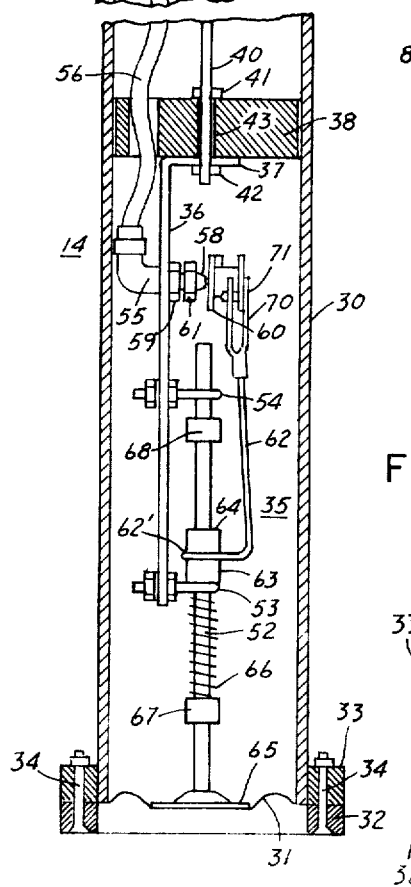
FIG. 3 is a enlarged sectional view of the lower portion of the sensing device of FIG. 2 shown during operation.
Figure 3:
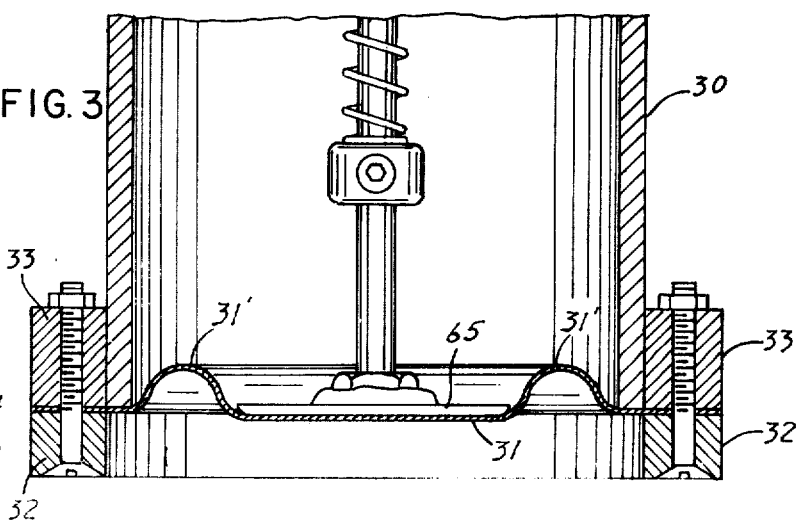

When the casing 30 is immersed in a liquid or other fluid substance in the tank 10, the diaphragm is urged upwardly and engages the bottom of the foot 65 which is substantially smaller than the internal diameter of the casing and the annular portion of the diaphragm 31 between the outer periphery of the foot 65 and the inner wall of the casing 30 balloons upwardly to form an upwardly extending annular portion 31' as indicated by the cross section of the diaphragm in FIG. 3. The liquid head urges the diaphragm and thus the foot 65 upwardly, the upward pressure being that on the entire diaphragm less the portion of the annular ballooned ring which slopes downwardly toward the line of attachment to the rings 32 and 33. The resultant force acts against the spring 66 and the weight of the rod 52 and parts secured thereto, and the link 62 is moved upwardly. The upward movement of the link 62 as illustrated in the drawings causes the nut 61 to move to the left as viewed in FIG. 2 and thereby decrease the flow of air through the orifice of the nozzle 58. Thus, as the diaphragm 31 rises and falls the orifice is moved toward its closed and opened positions, respectively. The range of operation of the sensing device may be selectively changed by moving the stops 63, 64 and 68 and by adjusting the compression of the spring 66 by moving the stop 67.

The details of construction of the sensing device are illustrated more clearly in FIGS. 4, 5 and 6. The set screws for securing the stops 63, 64, 67 and 68 to the rod 52 are illustrated at 63', 64', 67' and 68', respectively. The plate 60 is secured to the crank 71 by a hexagonal spacer element 72 and by a screw 73, and the plate 60 and the element 72 are rigidly secured to the nut 61 by a bar 74 which is welded, brazed or otherwise suitably secured to the nut 61 so that the nut and the spacer 72 rotate together when the crank 71 is turned.

As shown in FIG. 6 the elbow 55 is formed with a vertical bore or passage 75 and a threaded horizontal bore or passage 76. The nozzle 58 is a threaded cylinder screwed into the passage 76, and has a central passage 77 terminating in the orifice indicated at 78.

The movement of the plate 60 toward and away from the orifice 78 is effected by turning of the crank 71 and the parts secured thereto including the nut 61, the amount of axial movement of the nut 61 being determined by the pitch of the threads on the nozzle. The nut 59 is threaded and tightened on the nozzle against the bracket 36 to secure the elbow 55 in positon on the bracket.

Tests made with different sizes of the disc or foot 65 have indicated that when the disc has a diameter about one-half that of the internal diameter of the casing 30, very satisfactory operation is achieved. It appears that less satisfactory results are obtained when the foot 65 is either much smaller or much larger than one-half the internal diameter of the casing. The actual design of any application will, of course, depend upon the characteristics of the specific control and the material employed for the diaphragm 31. Consistent and accurate results are obtained by making the diaphragm loose so that under pressure it forms the upwardly ballooned annulus as indicated in FIG. 3.

During the installation of the level control device on a tank in many installations, it may be desirable that the level at which the device is mounted can be changed from time to time and that this can be done easily. For this reason, the support 15 constructed as indicated in FIG. 2 provides easy adjustment of the height of the arm 16 which is mounted on a slide 80 which is arranged to move vertically on a column 81 which is of channeled configuration. The slide 80 includes a back member 82 secured to the front member 80 on posts 83. The slide is secured to a ladder chain 84 which passes over top and bottom sprockets rotatably mounted on shafts 85 and 86, respectively. Shaft 85 extends outwardly through a block 87 and may be locked against rotation by a thumb screw 88. The shaft 85 may be provided with a suitable handle or key (not shown) which may be removed when the position has been set so that the adjustment of the device may not be accidentally changed. The column 81 is secured to a plate 90 and is mounted on the top edge of a tank as indicated in FIG. 1 by bolting or otherwise securing the plate 90 to the top of the tank. The arm 16 is provided with a vertical angle member 91 which engages the wall of the cylindrical casing 30 and is secured to the casing by screw clamps one of which is indicated at 92. It will now be apparent that the position of the cylinder 30 may be adjusted by operation of the ladder chain 84 and also by adjustment of the screw clamps 92 to determine the position at which the cylinder is secured to the arm 16.

It will be obvious that the movement effected by operation of the rod 52 of the device 35 may be employed to actuate liquid level control systems by mechanisms other than the air pressure actuated control system illustrated. By way of example, FIG. 7 illustrates somewhat diagrammatically the upper end of a device which is essentially similar to that shown in FIG. 4 and wherein corresponding parts have been designated by the same numerals with the addition of the letter "a". FIG. 7 illustrates an electric control wherein a variable resistance 94 is secured to the bracket 36a by a nut 95. The device 94 is a small rotary type variable resistance and has a shaft 96 which is coupled to the pipe 71a by a coupler 97 secured to the shaft 96 by a set screw 98. Resistance 94 is preferably of a type having long rotational life and having low starting and rotational torque and such that the resistance may be turned so that any segment may be utilized for engagement with the rotatable arm thereof. When the link 62a moves upwardly, the crank 71a is turned and the resistance 94 adjusted accordingly. The changing position of the resistance 94 produces a voltage or current which is utilized as a signal and delivered through lines 100 to a valve control unit 101 which actuates a valve motor 102 to operate the valve 24a as required by the signal.

The system illustrated in FIG. 7 may be operated for either direction of rotation in the same manner as that of the earlier figures.

As indicated heretofore, the material and dimensions of the diaphragm and the ratio of the diameter of the foot 65 to the internal diameter of the cylinder 30 will depend upon the specific design and application of the control device. Various rubbers and plastics will be found suitable for the diaphragm. For some applications of the control, other materials may be suitable, for example, a diaphragm of stainless steel having concentric corrugations may be usable, the looseness of the diaphragm being provided by the concentric corrugations which afford the required movement of the foot upon application of the head pressure.

Although this invention has been described in connection with specific types of controls, various modifications and other applications will occur to those skilled in the art. Therefore, it is not desired that this invention be limited to the specific details illustrated and described and it is intended by the appended claims to cover all modifications which fall within the spirit and the scope of the invention.

I claim:

1. An apparatus for converting a liquid head to an analogue signal which comprises a casing having an opening therein and a loose flexible diaphragm closing and sealing said opening, said casing being adapted to be mounted in a position above and adjacent the surface of a body of liquid in a liquid container, with said diaphragm being below the surface of the liquid at selected depths and subject to changes in liquid head pressure at such position a freely movable actuating member and means for mounting said actuating member in said casing said actuating member including a flat disc-like element positioned adjacent said opening for face engagement by said diaphragm upon changes in the liquid head, means for biasing said member toward said diaphragm, said biasing means including, as at least a part thereof, the weight of said member and parts secured thereto, said element having an area less than that of said opening and being spaced on all sides from the casing about said opening whereby the portion of said loose diaphragm between said casing and said element balloons inwardly upon the application of head pressure to said diaphragm, and control means responsive to movement of said element for generating an analogue signal corresponding to the liquid head.

2. The apparatus of claim 1 wherein said movement responsive means includes a gas pressure actuated control system having an orifice mounted to discharge gas into said casing, means responsive to movement of said member for controlling the discharge of gas from said orifice, and means for venting gas from said casing.

3. The apparatus of claim 1 wherein said means for generating an analogue signal is an electric current control device and said analogue signal is an electric signal and wherein movement of said member adjusts the setting of said control device.

4. The apparatus of claim 1 wherein said opening is of circular configuration and said element is circular and is positioned substantially concentrically with said opening.

5. The apparatus of claim 4 wherein said casing is of upright cylindrical configuration and said opening is at the bottom thereof.

6. The apparatus of claim 4 wherein said opening is the open bottom end of said cylindrical casing and said element is circular and substantially concentric with said cylinder and wherein said diaphragm when subjected to pressure head balloons upwardly in an annulus in the space between the inner wall of said cylinder and the edge of said element.

7. The apparatus of claim 6 wherein said actuating member includes a rod extending longitudinally of said cylinder and said element is mounted at the bottom of said rod.

8. The apparatus of claim 1 including a gas pressure actuated control system including a nozzle mounted in said casing and having an orifice to discharge gas into said casing and wherein said means for generating an analogue signal controls the discharge of gas from said orifice.

9. The apparatus of claim 1 including a spring for biasing said element toward the diaphragm.

10. The apparatus of claim 1 wherein said analogue signal generating means includes a rotatable shaft and means utilizing movement of said element for rotating said shaft.

11. The apparatus of claim 1 including means for adjusting the position of said mounting means for said actuating menber with respect to said casing.

12. An apparatus for converting a liquid head to an analogue signal which comprises a casing having an opening therein and a loose flexible diaphragm closing and sealing said opening, said casing being of upright cylindrical configuration, said casing being adapted to be mounted in a position above and adjacent the surface of a body of liquid in a liquid container, with said diaphragm being below the surface of the liquid at selected depths and subject to changes in liquid head pressure at such position an actuating member mounted in said casing and including a flat disc-like element positioned adjacent said opening for face engagement by said diaphragm upon changes in the liquid head, said opening being of circular configuration and said element being circular and being positioned substantially concentrically with said opening, and said actuating member including a rod extending longitudinally of said cylinder and said element being mounted at the bottom of said rod, spaced guides for said rod and adjustable collars on said rod for selecting the range of movement of said rod in said guides, said opening being the open bottom end of said cylindrical casing and said element being circular and substantially concentric with said cylinder and said element having an area less than that of said opening and being spaced on all sides from the casing about said opening whereby the portion of said loose diaphragm between said casing and said element balloons inward upwardly in an annulus upon the application of head pressure to said diaphragm, and control means responsive to movement of said element for generating an analogue signal corresponding to the liquid head.

13. The apparatus of claim 8 including a valve member threaded on said nozzle and moveable toward and away from said orifice and means utilizing movement of said actuating member for rotating said valve member in accordance with movement of said element.

14. An apparatus for converting a liquid head to an analogue signal which comprises a casing having an opening therein and a loose flexible diaphragm closing and sealing said opening, said casing being adapted to be mounted in a position above and adjacent the surface of a body of liquid in a liquid container, with said diaphragm being below the surface of the liquid at selected depths and subject to changes in liquid head pressure at such position, the looseness of said diaphragm affording a substantial range of movement of said disc in response to changes in liquid head pressure an actuating member mounted in said casing and including a flat disc-like element positioned adjacent said opening for face engagement by said diaphragm upon changes in the liquid head, said element having an area less than that of said opening and being spaced on all sides from the casing about said opening whereby the portion of said loose diaphragm between said casing and said element balloons inwardly upon the application of head pressure to said diaphragm, and control means responsive to movement of said element for generating an analogue signal corresponding to the liquid head, said control means for generating an analogue signal including a link connected to transmit movement from said element and said link being mounted for at least limited free rotational movement with respect to said element.

15. The apparatus of claim 14 including a spring for biasing said element toward the diaphragm and means for adjusting the compression of said spring for effecting a calibration of said apparatus.

16. An apparatus for converting a liquid head to an analogue signal which comprises an upright elongated casing, a loose flexible diaphragm closing and sealing the lower end of said casing, an actuating member mounted for longitudinal movement in said casing, a disc having an area substantially less than that of the adjacent cross section of said casing mounted on said member and positoned near the bottom of said casing adjacent said diaphragm for face engagement therewith, said casing being adapted to be mounted in a position above and adjacent the surface of a body of liquid in a liquid container, with said diaphragm being below the surface of the liquid at selected depths and subject to changes in liquid head pressure at such positon, the looseness of said diaphram affording a substantial range of movement of said disc in response to changes in liquid head pressure, said diaphragm being urged upwardly by the head of the liquid and engaging said disc, the upward force of said diaphragm on said disc being opposed at least in part by the biasing force of the weight of said actuating member and of any parts secured thereto, a control device including a control nozzle for discharging gas from the device and controlling the pressure therein, means dependent upon the movement of said disc with changes of the liquid head for adjusting the discharge of gas from said nozzle, and control means utilizing the changes in the gas pressure in said device for maintaining a predetermined level of liquid in said container.

17. An apparatus for converting a liquid head to a gas pressure as described in claim 16, wherein said nozzle includes an orifice positioned to discharge gas into said casing, and means for venting said casing.

18. An apparatus for converting a liquid head to a gas pressure as set forth in claim 17 wherein said means for adjusting the discharge of gas from said nozzle comprises a plate positioned normal to the axis of said nozzle and means threaded on said nozzle for moving said plate toward and away from the orifice of said nozzle in accordance with the movement of said element.

19. In a liquid level control system of the type utilizing a gas pressure responsive device for maintaining a predetermined level of liquid in a container the improvement which comprises:

an upright elongated casing vented to the ambient atmosphere near its upper end and having a loose flexible diaphragm closing and sealing its lower end, said casing being adapted to be mounted in a position above and adjacent the surface of a body of liquid in a liquid container, with said diaphragm being below the surface of the liquid at selected depths and subject to changes in liquid head pressure at such position a gas nozzle mounted within an upper portion of said casing for discharging gas from the gas pressure responsive device, means in said casing arranged to vary the flow of gas through said nozzle for controlling the pressure of the gas in said pressure responsive device, said pressure controlling means including a member mounted for movement axially of said casing and having a flat plate positioned for face engagement with said diaphragm and having an area less than that of said diaphragm and spaced from said casing about its periphery, the liquid pressure against the bottom of said diaphragm causing the portion of the diaphragm between the flat plate and the casing to balloon upwardly, said member and plate tending to fall by gravity toward said diaphragm, stop means for limiting the downward movement of said member and adjustable spring means for further biasing said member toward said stop means and for calibrating said pressure controlling means, whereby the weight of said member and the parts secured thereto together with the compression force of said spring means constitute the force opposing the upward liquid head force on said diaphragm, said controlling means further including a valve element movable to vary the amount of gas discharged from said nozzle and means connecting said element and said member for moving said valve element in accordance with the movement of said diaphragm upon changes in the liquid pressure head thereon.

* * * * *